United States Patent
Dindar et al.

(10) Patent No.: US 8,984,890 B2
(45) Date of Patent: Mar. 24, 2015

(54) TURBOFAN ENGINE MIXER ASSEMBLY

(75) Inventors: Mustafa Dindar, Cincinnati, OH (US); Vaughn Kunze, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 739 days.

(21) Appl. No.: 13/285,826

(22) Filed: Oct. 31, 2011

(65) Prior Publication Data
US 2013/0104555 A1  May 2, 2013

(51) Int. Cl.
*F02K 1/00* (2006.01)
*F02K 1/48* (2006.01)
F02C 7/045 (2006.01)
F02K 1/38 (2006.01)

(52) U.S. Cl.
CPC . *F02K 1/48* (2013.01); *F02C 7/045* (2013.01); *F02K 1/386* (2013.01); *F05D 2250/183* (2013.01)
USPC ........ 60/770; 181/213; 181/220; 239/265.19; 60/226.1; 60/264

(58) Field of Classification Search
CPC ............ F02C 7/045; F02K 1/386; F02K 1/48
USPC ................ 181/220, 213; 239/265.11, 265.19, 239/265.17; 60/770, 264, 226.1, 262, 771
See application file for complete search history.

(56) References Cited

U.S. PATENT DOCUMENTS

| | | | |
|---|---|---|---|
| 3,053,340 A | 9/1962 | Kutney | |
| 4,302,934 A * | 12/1981 | Wynosky et al. | 60/262 |
| 4,401,269 A | 8/1983 | Eiler | |
| 4,548,034 A * | 10/1985 | Maguire | 60/262 |
| 4,576,002 A * | 3/1986 | Mavrocostas | 60/262 |
| 6,412,283 B1 | 7/2002 | Sheoran et al. | |
| 6,578,355 B1 | 6/2003 | Mundt | |
| 7,017,331 B2 * | 3/2006 | Anderson | 60/204 |
| 7,017,332 B2 | 3/2006 | Oishi | |
| 7,114,323 B2 * | 10/2006 | Schlinker et al. | 60/204 |
| 7,392,651 B2 * | 7/2008 | Goutines et al. | 60/262 |
| 7,434,384 B2 * | 10/2008 | Lord et al. | 60/262 |
| 7,581,384 B2 * | 9/2009 | Au et al. | 60/262 |
| 7,677,026 B2 * | 3/2010 | Conete et al. | 60/262 |
| 8,584,356 B2 * | 11/2013 | Philippe et al. | 29/889.21 |
| 8,635,875 B2 * | 1/2014 | Huzzard Cunningham | 60/770 |
| 2009/0084111 A1 * | 4/2009 | Aeberli et al. | 60/770 |
| 2011/0126512 A1 * | 6/2011 | Anderson | 60/262 |

FOREIGN PATENT DOCUMENTS

EP   2383455 A2   11/2011
FR   2902468 A1   12/2007

OTHER PUBLICATIONS

Search Report from EP Application No. 12190425.4 dated Dec. 4, 2013.

* cited by examiner

*Primary Examiner* — William H Rodriguez
(74) *Attorney, Agent, or Firm* — General Electric Company; Pamela A. Kachur

(57) ABSTRACT

A mixer for mixing flows in a turbofan engine is provided. The mixer includes a plurality of chevron lobes, each of the plurality of lobes comprising a crown, a keel, a first trailing edge, a second trailing edge, and a first transverse edge extending between first trailing edge and second trailing edge, said mixer configured to receive two separate incoming exhaust flows and mix the two flows into at least one rotational exhaust flow that is ejected out at least one of said first trailing edge and said second trailing edge.

9 Claims, 4 Drawing Sheets

TURBOFAN ENGINE MIXER ASSEMBLY

BACKGROUND OF THE INVENTION

This invention relates generally to turbofan engines, and more particularly to a lobe-chevron mixer that may be utilized with a turbofan engine of an aircraft.

At least one known turbofan engine includes a fan assembly, a core gas turbine engine enclosed in an annular core cowl, and a fan nacelle that surrounds a portion of the core gas turbine engine. At least some known turbofan engines include a mixed flow exhaust system that includes a mixer. In those systems, cold fan flow is mixed with an expanding core engine flow such that the mixture of the two flows produce thrust for the engine. Mixers are often restricted by a need for a long nacelle that adds to the overall weight of the engine.

BRIEF DESCRIPTION OF THE INVENTION

In one aspect, a mixer for mixing flows in a turbofan engine is provided. The mixer includes a plurality of chevron lobes, each of the plurality of lobes includes a crown, a keel, a first trailing edge, a second trailing edge, and a first transverse edge extending between the first trailing edge and the second trailing edge, the mixer is configured to receive two separate incoming exhaust flows and mix the two flows into at least one rotational exhaust flow that is ejected out at least one of the first trailing edge and the second trailing edge.

In a further aspect, a turbofan engine is provided. The turbofan engine includes a mixer that has a plurality of chevron lobes, each of the plurality of lobes includes a crown, a keel, a first trailing edge, a second trailing edge, and a first transverse edge extending between the first trailing edge and the second trailing edge, the mixer is configured to receive two separate incoming exhaust flows and mix the two flows into at least one rotational exhaust flow that is ejected out at least one of the first trailing edge and the second trailing edge.

In a further aspect, an aircraft is provided. The aircraft includes a turbo fan engine and a mixer that has a plurality of chevron lobes, each of the plurality of lobes includes a crown, a keel, a first trailing edge, a second trailing edge, and a first transverse edge extending between the first trailing edge and the second trailing edge, the mixer is configured to receive two separate incoming exhaust flows and mix the two flows into at least one rotational exhaust flow that is ejected out at least one of the first trailing edge and the second trailing edge.

DETAILED DESCRIPTION OF THE INVENTION

Figure 1:
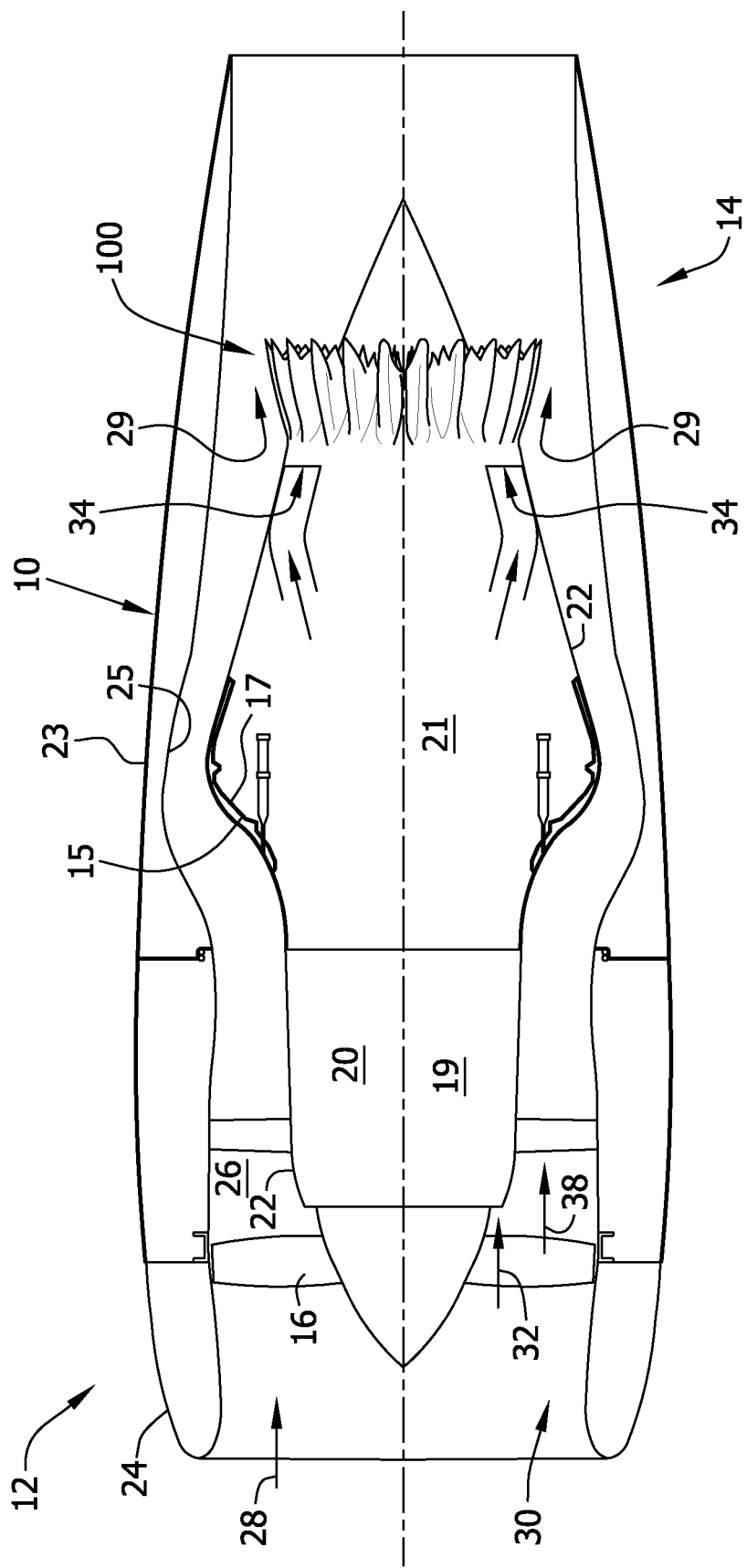
FIG. 1 is a cross-sectional view of an exemplary turbofan engine assembly that includes an exemplary lobe-chevron mixer.
Figure 2:
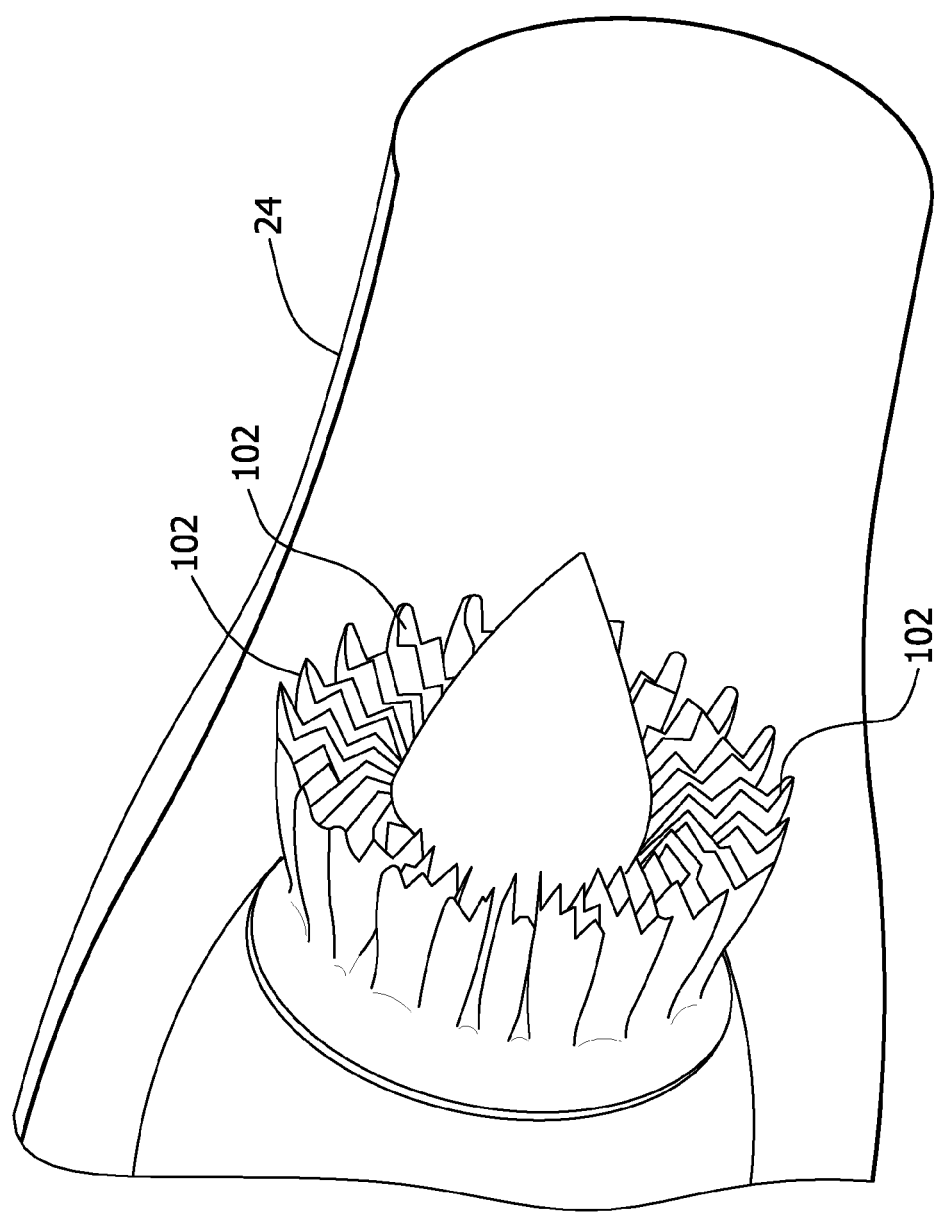
FIG. 2 is a perspective view of aft end of a turbofan engine assembly that includes an exemplary lobe-chevron mixer shown in FIG. 1.

FIG. 1 is a cross-sectional view of exemplary turbofan engine assembly 10 that includes lobe-chevron mixer 100 that is part of an aircraft. FIG. 2 is a perspective view of aft end of a turbofan engine assembly that includes an exemplary lobe-chevron mixer shown in FIG. 1. In the exemplary embodiment, turbofan engine assembly 10 has a forward end portion 12 and an aft end portion 14 and includes a core gas turbine engine 20 that includes a high-pressure compressor, a combustor, and a high-pressure turbine (all not shown). Turbofan engine assembly 10 also includes a low-pressure turbine (not shown) that is disposed axially downstream from core gas turbine engine 20, and a fan assembly 16 that is disposed axially upstream from core gas turbine engine 20. In the exemplary embodiment, turbofan engine assembly 10 includes an annular core cowl 22 that extends around core gas turbine engine 20 and includes a radially outer surface 15 and a radially inner surface 17. In the exemplary embodiment, core cowl 22 includes a first portion 19 that surrounds the high-pressure compressor and the combustor, and a second portion 21 that surrounds the high-pressure turbine and the low-pressure turbine. Second portion 21 is coupled to and positioned downstream from first portion 19. Turbofan engine assembly 10 also includes an inlet 30, a first outlet 29, and a second outlet 34.

Turbofan engine assembly 10 further includes a fan nacelle 24 that surrounds fan assembly 16 and is spaced radially outward from core cowl 22. Nacelle 24 includes a radially outer surface 23 and a radially inner surface 25. A fan nozzle duct 26 is defined between radially outer surface 15 of core cowl 22 and radially inner surface 25 of nacelle 24.

During operation, airflow 28 enters inlet 30, flows through fan assembly 16, and is discharged downstream through mixer 100. A first portion or first flow 32 of airflow 28 is channeled through core gas turbine engine 20, compressed, mixed with fuel, and ignited for generating combustion gases which are discharged from core gas turbine engine 20 through second outlet 34 into mixer 100. A second portion or second flow 38 of airflow 28 is channeled downstream through fan nozzle duct 26 which is discharged from fan nozzle duct 26 through first outlet 29 around mixer 100. Mixer 100 includes individual lobes 102 that receive first portion 32 and channel second portion 38 over lobes 102, mix first portion 32 and second portion 38 and eject from mixer 100 the mixture in a rotational flow or flows.

Figure 3:
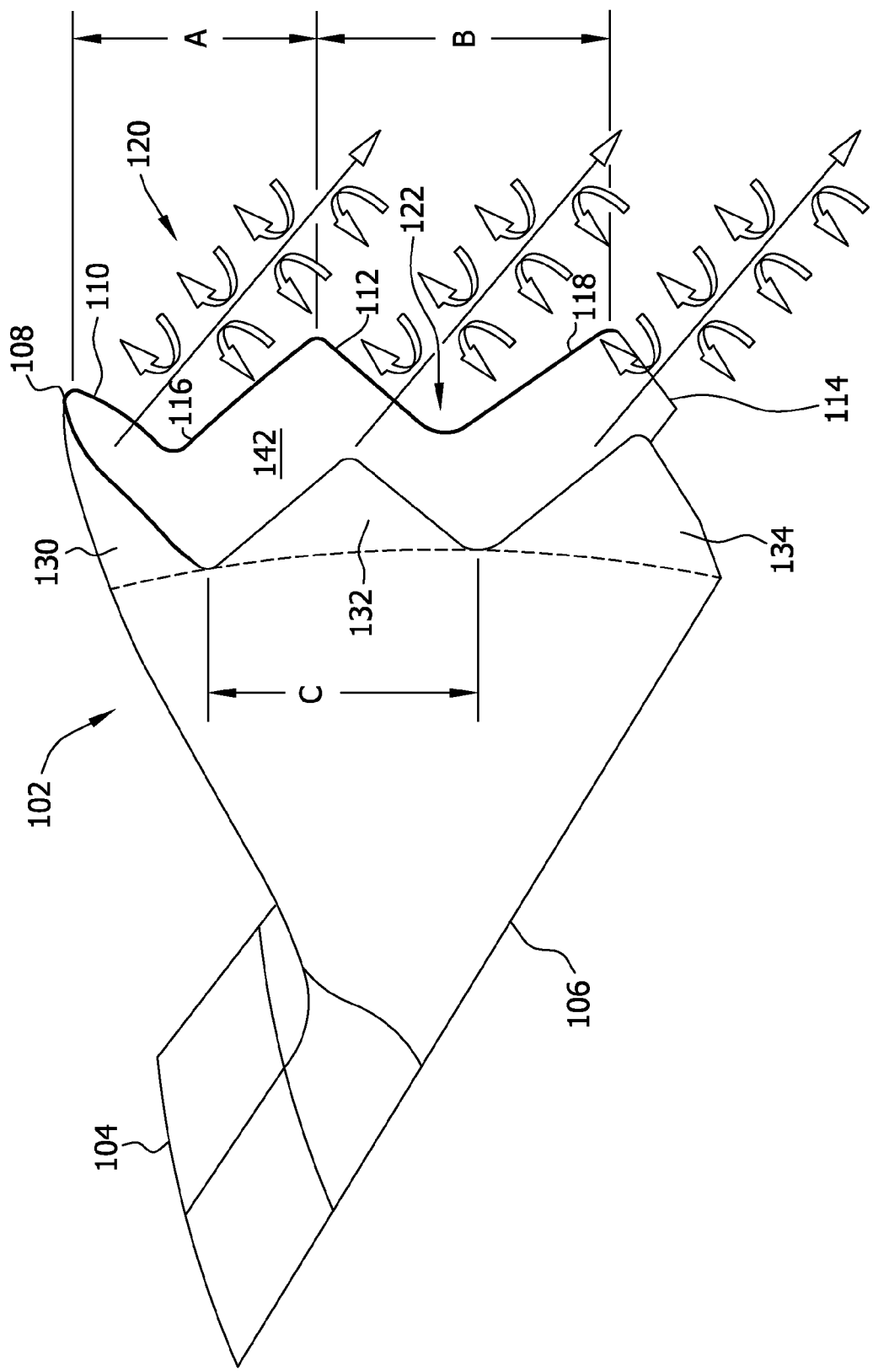
FIG. 3 is a perspective view of an individual lobe of the lobe-chevron mixer shown in FIG. 2.
Figure 4:
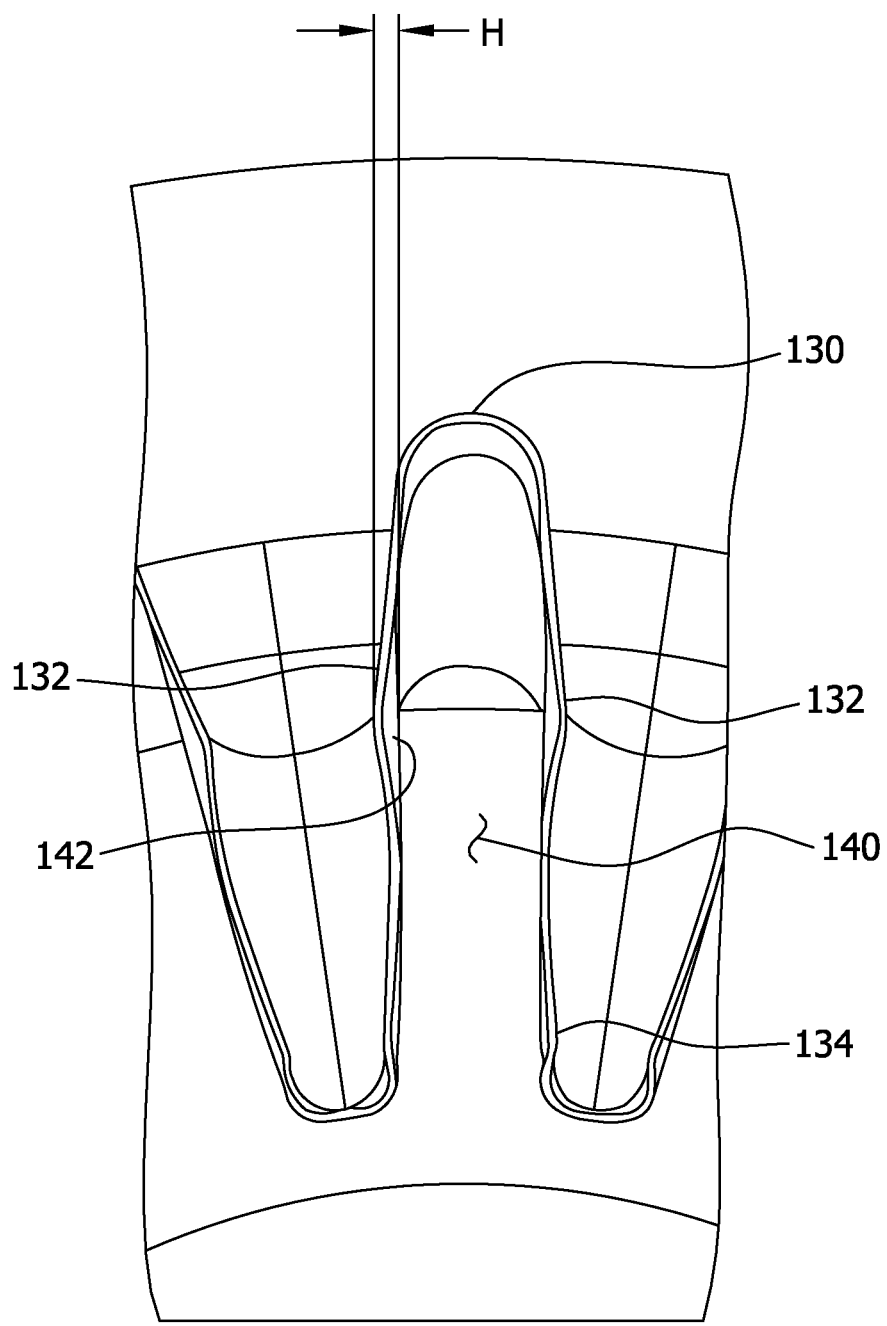
FIG. 4 is a front perspective view of a lobe of the lobe-chevron mixer shown in FIG. 2.

FIG. 3 is a perspective view of an individual lobe 102 of the lobe-chevron mixer 100 shown in FIG. 2. FIG. 4 is a front perspective view of a lobe 102 of the lobe-chevron mixer shown in FIG. 2. In the exemplary embodiment mixer 100 is fabricated with lobes 102 adjoining circumferentially around mixer 100. In the exemplary embodiment, each lobe 102 includes a forward edge 104, a keel 106, a crown 108, and a plurality of trailing edges 110, 112, and 114. Crown 108 refers to the radially outermost portion of lobe 102. In the exemplary embodiment, lobe 102 includes a first trailing edge 110, a second trailing edge 112, and a third trailing edge 114. Lobe 102 also includes a first transverse edge 116 and a second transverse edge 118. First transverse edge 116 extends laterally from first trailing edge 110 to second trailing edge 112 and second transverse edge 118 extends laterally from second trailing edge 112 to third trailing edge 114.

Alternatively, mixer 100 can have any number of trailing edges that facilitate mixing flows as described herein. In one embodiment, mixer 100 is fabricated with two trailing edges having a transverse edge extending between the two distinct trailing edges. In another embodiment, mixer 100 is fabricated with four distinct trailing edges having three transverse edges extending respectively between the four distinct trailing edges.

In the exemplary embodiment, a first chevron 120 is formed by first trailing edge 110 and first transverse edge 116. Similarly, a second chevron 122 is formed by second trailing edge 112 and second transverse edge 118. In the exemplary embodiment, a 45° angle is formed in first chevron 120 at the location where first trailing edge 110 and first transverse edge 116 intersect. Second chevron 122 forms a 45° angle at the location where second trailing edge 112 intersects second transverse edge 118. Alternatively, the angles formed in both first chevron 120 and second chevron can be an angle that facilitates mixing flows as described herein. In one embodiment, first chevron 120 and second chevron 122 are not symmetrical on each lobe 102. In such an embodiment, chevrons 120 and 122 have a variable pitch. In another embodiment, chevrons 120 and 122 are symmetrical on each lobe 102.

In the exemplary embodiment, first chevron 120 extends a distance A between the most radially outward point of first trailing edge 110 to the most radially outward point of trailing edge 112. Similarly, second chevron 122 extends a distance B between the most radially outward point of second trailing edge 112 and the most radially outward point of third trailing edge 114. In one embodiment, distance A and distance B are each the same length, however, distance A and distance B can have unequal lengths. In one embodiment, distance A and distance B are 3.5 inches. Alternatively, distance A and distance B can each be any distance that facilitates mixing flows as described herein. In one embodiment, chevrons 120 and 122 change from one lobe 102 to another to form a non-axi symmetric pattern around mixer 100. In another embodiment, chevrons 120 and 122 do form a symmetric pattern around mixer 100.

In the exemplary embodiment, a distance C is measured between the most radially inward point of first trailing edge 110 to the most radially outward point of second trailing edge 112. In one embodiment, distance C is 2.5 inches. Alternatively, distance C can be any distance that facilitates mixing flows as described herein.

In the exemplary embodiment, mixer 100 includes chevron tips 130, 132, and 134 that are folded or bent from a vertical position as shown in FIG. 4. Mixer 100 includes a first chevron tip 130, a second chevron tip 132, and a third chevron tip 134. First chevron tip 130 defined by a portion of lobe 102 from crown 108 to the most radially inward point of first trailing edge 110. Second chevron tip 132 is defined between the most radially inward point of first trailing edge 110 to the most radially outward point of second trailing edge 112 up to first transverse edge 116 and second trailing edge 112. Third chevron tip 134 is defined between the most radially inward point of second trailing edge 112 and the most radially inward point of third trailing edge 114 up to second transverse edge 118 and third trailing edge 114.

In the exemplary embodiment, chevron tips 130, 132, and 134 are folded outward from an interior portion 140 of lobe 102. In such an embodiment, second chevron tip 132 is folded outward a distance H from an interior surface 142 of lobe 102. In one embodiment, distance H is 0.25 inches. Alternatively, distance H can be any distance that facilitates mixing flows as described herein. In an alternative embodiment, tips 130, 132, and 134 are folded inward towards interior portion 140 of lobe 102. Alternatively, each of tips 130, 132, and 134 can be folded in and direction that facilitates mixing flows as described herein irrespective of the other chevron tips. In one embodiment, first tip 130 is folded outward, second tip 132 is folded inward, and third tip is not folded. In one embodiment, tips 130, 132, and 134 on mixer 100 have no symmetry and do not form any continuous pattern around mixer 100.

During operation, mixer 100 receives first flow 32 and second flow 38 of airflow 28 such that the flows 32 and 38 are mixed as flow 32 is ejected out of mixer 100 into the ambient. The mixing of flows 32 and 38 provides thrust to engine 10 as is exits mixer 100. The three trailing edges 110, 112, and 114, which define the two chevrons 120 and 122, create three separate rotational flows resulting from the mixing of flows 32 and 38. Each of the three rotational flows exit mixer 100 through a respective trailing edge 110, 112, and 114. A first rotational flow is created that exits past first trailing edge 110, a second rotational flow is created that exits mixer 100 past second trailing edge 112, and a third rotational flow is created that exits mixer 100 past third trailing edge 114.

Generally, improved mixing of flows 32 and 38 over known systems will provide an increase in thrust, which will result in more efficient fuel consumption. Additionally, an improved mixing of flows 32 and 38 over known systems will reduce an engine's 10 noise signature as well as lower exiting exhaust temperatures. The mixer described herein improves the mixing effectiveness of flows 32 and 38 over conventional mixers, thus increasing thrust, improving fuel consumption, lowering engine noise signatures, and decreasing exhaust temperatures.

Described herein is lobe-chevron mixer that may be utilized on a wide variety of turbofan engine assemblies coupled to an aircraft. The mixer described herein improves engine performance, fuel consumption, and noise signatures by creating multiple rotational exhaust flows.

An exemplary embodiment of a lobe-chevron mixer for a turbofan engine assembly is described above in detail. The lobe-chevron mixer illustrated is not limited to the specific embodiments described herein, but rather, components of each assembly may be utilized independently and separately from other components described herein.

While the invention has been described in terms of various specific embodiments, those skilled in the art will recognize that the invention can be practiced with modification within the spirit and scope of the claims.

What is claimed is:

1. A mixer for mixing flows in a turbofan engine, said mixer comprising:
    a plurality of chevron lobes, each of the plurality of lobes comprising a crown, a keel, a first trailing edge, a second trailing edge, and a first transverse edge extending between said first trailing edge and said second trailing edge, said mixer configured to receive two separate incoming exhaust flows and mix the two flows;
    wherein said plurality of chevron lobes further comprises a first chevron defined by said first trailing edge and said first transverse edge;
    wherein each of said plurality of chevron lobes comprise first and second chevron tips, said second chevron tip defined between said first transverse edge and said second trailing edge;
    wherein said first chevron tip is defined from said crown to the most radially inward point of said first trailing edge;
    wherein one or both of said first and second chevron tips are folded outward from an interior portion of a respective lobe or folded inwards from said interior portion of said respective lobe.

2. A mixer in accordance with claim 1, wherein said plurality of chevron lobes further comprises a third trailing edge and a second transverse edge extending between said second trailing edge and said third trailing edge.

3. A mixer in accordance with claim 2, wherein said plurality of chevron lobes further comprises a second chevron defined by said second trailing edge and said second transverse edge.

4. A turbofan engine comprising:
    a mixer for mixing flows in a turbofan engine, said mixer comprising a plurality of chevron lobes, each of the plurality of lobes comprising a crown, a keel, a first trailing edge, a second trailing edge, and a first transverse edge extending between said first trailing edge and said second trailing edge, said mixer configured to receive two separate incoming exhaust flows and mix the two flows;

wherein said plurality of chevron lobes further comprises a first chevron defined by said first trailing edge and said first transverse edge;

wherein each of said plurality of chevron lobes comprise first and second chevron tips, said second chevron tip defined between said first transverse edge and said second trailing edge;

wherein said first chevron tip is defined from said crown to the most radially inward point of said first trailing edge;

wherein one or both of said first and second chevron tips are folded outward from an interior portion of a respective lobe or folded inwards from said interior portion of said respective lobe.

5. A turbofan engine in accordance with claim 4, wherein said plurality of chevron lobes further comprises a third trailing edge and a second transverse edge extending between said second trailing edge and said third trailing edge.

6. A turbofan engine in accordance with claim 5, wherein said plurality of chevron lobes further comprises a second chevron defined by said second trailing edge and said second transverse edge.

7. An aircraft comprising:
a turbofan engine comprising a mixer for mixing flows in a turbofan engine, said mixer comprising a plurality of chevron lobes, each of the plurality of lobes comprising a crown, a keel, a first trailing edge, a second trailing edge, and a first transverse edge extending between said first trailing edge and said second trailing edge, said mixer configured to receive two separate incoming exhaust flows and mix the two flows;

wherein said plurality of chevron lobes further comprises a first chevron defined by said first trailing edge and said first transverse edge;

wherein each of said plurality of chevron lobes comprise first and second chevron tips, said second chevron tip defined between said first transverse edge and said second trailing edge;

wherein said first chevron tip is defined from said crown to the most radially inward point of said first trailing edge;

wherein one or both of said first and second chevron tips are folded outward from an interior portion of a respective lobe or folded inwards from said interior portion of said respective lobe.

8. An aircraft comprising: a turbofan engine in accordance with claim 7, wherein said plurality of chevron lobes further comprises a third trailing edge and a second transverse edge extending between said second trailing edge and said third trailing edge.

9. An aircraft comprising: a turbofan engine in accordance with claim 8, wherein said plurality of chevron lobes further comprises a second chevron defined by said second trailing edge and said second transverse edge.

* * * * *